(12) United States Patent
Couillard et al.

(10) Patent No.: US 11,872,787 B2
(45) Date of Patent: Jan. 16, 2024

(54) DIMMABLE WINDOW PANE WITH REDUCED BOW AND INSULATED GLAZING UNIT COMPRISING THE SAME

(71) Applicants: CORNING INCORPORATED, Corning, NY (US); MERCK PATENT GMBH, Darmstadt (DE)

(72) Inventors: James Gregory Couillard, Ithaca, NY (US); Lisa Lynn Griesbach Hawkins, Corning, NY (US); James Martin Grochocinski, Newfield, NY (US); Rainer Neeff, Neu-Isenburg (DE); Felix Fritz Rudolf-Schlosser, Eichstaett (DE)

(73) Assignees: CORNING INCORPORATED, Corning, NY (US); MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/348,258

(22) PCT Filed: Nov. 9, 2017

(86) PCT No.: PCT/US2017/060740
§ 371 (c)(1),
(2) Date: May 8, 2019

(87) PCT Pub. No.: WO2018/089562
PCT Pub. Date: May 17, 2018

(65) Prior Publication Data
US 2019/0270284 A1    Sep. 5, 2019

Related U.S. Application Data

(60) Provisional application No. 62/419,633, filed on Nov. 9, 2016.

(51) Int. Cl.
*B32B 17/10* (2006.01)
*B32B 7/12* (2006.01)

(52) U.S. Cl.
CPC ......... *B32B 17/10504* (2013.01); *B32B 7/12* (2013.01); *B32B 17/10036* (2013.01);
(Continued)

(58) Field of Classification Search
CPC ......... B32B 17/10504; B32B 17/1077; B32B 17/10091; B32B 17/10467;
(Continued)

(56) References Cited

U.S. PATENT DOCUMENTS 4,456,335 A    6/1984  Mumford
4,882,235 A    11/1989 Resler
(Continued)

FOREIGN PATENT DOCUMENTS

DE    102006042538 A1 *  3/2008 ....... B32B 17/10036
DE    102006042538 A1     3/2008
(Continued)

OTHER PUBLICATIONS

International Search Report and Written Opinion of the International Searching Authority; PCT/US2017/060740 dated Mar. 6, 2018; 11 Pages; European Patent Office.
(Continued)

*Primary Examiner* — Eli D. Strah

(57) ABSTRACT

A window pane includes a transmission control layer including a first glass sheet, a second glass sheet, and a liquid crystal material disposed between the first glass sheet and the second glass sheet. Each of the first glass sheet and the second glass sheet has a thickness of about 1 mm or less. A first panel is bonded to the first glass sheet of the transmission control layer. A second panel is bonded to the second glass sheet of the transmission control layer. The transmission control layer is disposed between the first panel and the second panel. The liquid crystal material is controllable to adjust a transmittance of the window pane.

8 Claims, 3 Drawing Sheets

(52) U.S. Cl.
CPC .. *B32B 17/10045* (2013.01); *B32B 17/10055* (2013.01); *B32B 17/1077* (2013.01); *B32B 17/10091* (2013.01); *B32B 17/10119* (2013.01); *B32B 17/10137* (2013.01); *B32B 17/10174* (2013.01); *B32B 17/10467* (2013.01); *B32B 17/10486* (2013.01); *B32B 17/10513* (2013.01); *B32B 17/10761* (2013.01); *B32B 17/10788* (2013.01); *B32B 2419/00* (2013.01); *B32B 2457/20* (2013.01); *B32B 2457/202* (2013.01); *C09J 2203/318* (2013.01); *C09K 2323/02* (2020.08)

(58) Field of Classification Search
CPC ......... B32B 17/10119; B32B 17/10174; B32B 17/10788; B32B 17/10761; B32B 17/10045; B32B 17/10036; B32B 17/10055; B32B 17/10137; B32B 17/10486; B32B 17/10513; B32B 7/12; B32B 2457/20; B32B 2457/202; B32B 2419/00; C09K 2323/02; C09J 2203/318
See application file for complete search history.

(56) References Cited

U.S. PATENT DOCUMENTS

| | | | |
|---|---|---|---|
| 5,025,602 A | 6/1991 | Baughman et al. | |
| 5,197,242 A | 3/1993 | Baughman et al. | |
| 7,356,969 B1 | 4/2008 | Yurth et al. | |
| 9,063,358 B2 | 6/2015 | Li et al. | |
| 10,189,228 B2 | 1/2019 | Couillard et al. | |
| 2004/0229049 A1 | 11/2004 | Boire et al. | |
| 2005/0068629 A1 | 3/2005 | Fernando et al. | |
| 2005/0211699 A1* | 9/2005 | Faris | G02F 1/1334 219/522 |
| 2008/0158448 A1* | 7/2008 | Fernando | E06B 9/24 349/16 |
| 2009/0115922 A1 | 5/2009 | Veerasamy | |
| 2009/0176640 A1* | 7/2009 | Maehara | C03C 3/091 65/99.2 |
| 2010/0084016 A1* | 4/2010 | Aitken | C03C 3/091 136/258 |
| 2010/0197477 A1* | 8/2010 | Ellison | C03C 3/091 501/53 |
| 2012/0017975 A1* | 1/2012 | Giron | B32B 17/10174 136/252 |
| 2012/0247063 A1* | 10/2012 | Grzybowski | C03C 23/005 52/786.13 |
| 2015/0024184 A1* | 1/2015 | Bertolini | B32B 17/1044 428/217 |
| 2015/0277165 A1 | 10/2015 | Burrows et al. | |
| 2016/0147100 A1 | 5/2016 | Van Oosten et al. | |
| 2016/0161780 A1 | 6/2016 | Van Oosten et al. | |
| 2016/0193812 A1 | 7/2016 | Couillard | |

FOREIGN PATENT DOCUMENTS

| | | | |
|---|---|---|---|
| JP | 2002-520654 A | 7/2002 | |
| JP | 2007-004083 A | 1/2007 | |
| JP | 2010-230759 A | 10/2010 | |
| JP | 2011-218610 A | 11/2011 | |
| JP | 2015-055831 A | 3/2015 | |
| JP | 2015-091746 A | 5/2015 | |
| JP | 2016-503510 A | 2/2016 | |
| WO | WO-2015046490 A1 * | 4/2015 | ............ B32B 17/06 |
| WO | 2015117736 A1 | 8/2015 | |
| WO | 2016008375 A1 | 1/2016 | |

OTHER PUBLICATIONS

Japanese Patent Application No. 2019-524160, Office Action dated Sep. 22, 2021, 10 pages (5 pages of English Translation and 5 pages of Original Document), Japanese Patent Office.

Japanese Patent Application No. 2019-524160, Office Action, dated Jun. 22, 2022, 10 pages (5 pages of English Translation and 5 pages of Original Copy); Japanese Patent Office.

* cited by examiner

DIMMABLE WINDOW PANE WITH REDUCED BOW AND INSULATED GLAZING UNIT COMPRISING THE SAME

This application claims the benefit of priority under 35 U.S.C. § 371 of International Application No. PCT/US2017/060740 filed on Nov. 9, 2017, which claims the benefit of priority under 35 U.S.C. § 119 of U.S. Provisional Application Ser. No. 62/419,633, filed on Nov. 9, 2016, the content both of which is are relied upon and incorporated herein by reference in their entirety.

BACKGROUND

1. Field

This disclosure relates to window panes, and more particularly, to dimmable window panes and insulated glazing units comprising the same.

2. Technical Background

An insulated glazing unit (IGU) generally includes two or three panes separated from one another by an air gap to form a thermal barrier that inhibits heat conduction between inner and outer surfaces of the IGU, thereby inhibiting heat conduction between an interior of a building in which the IGU is installed and the exterior environment. By inhibiting heat transfer, IGUs can reduce building heating and/or cooling costs.

A dimmable IGU generally includes a dimmable layer (e.g., a liquid crystal or electrochromic layer) that can be used to control light transmission through the IGU. The dimmable layer is bonded to a glass or polymer sheet to form a dimmable pane of the IGU.

SUMMARY

Disclosed herein are dimmable window panes and insulated glazing units comprising the same.

Disclosed herein is a window pane comprising a transmission control layer comprising a first glass sheet, a second glass sheet, and a liquid crystal material disposed between the first glass sheet and the second glass sheet. Each of the first glass sheet and the second glass sheet has a thickness of about 1 mm or less. A first panel is bonded to the first glass sheet of the transmission control layer. A second panel is bonded to the second glass sheet of the transmission control layer. The transmission control layer is disposed between the first panel and the second panel. The liquid crystal material is controllable to adjust a transmittance of the window pane.

Disclosed herein is a window pane comprising a transmission control layer comprising a transmission control material that is controllable to adjust a transmittance of the window pane. A first panel is bonded to a first outer surface of the transmission control layer. A second panel is bonded to a second outer surface of the transmission control layer. Each of the first panel and the second panel is a glass panel with a thickness of about 4 mm to about 6 mm. A bow of the window pane is about 0.02 mm or less per 40 mm of length.

Disclosed herein is an insulated glazing unit comprising a window pane as described herein, third panel, and a spacer disposed between the window pane and the third panel such that a cavity is disposed between the window pane and the third panel and is substantially circumscribed by the spacer.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
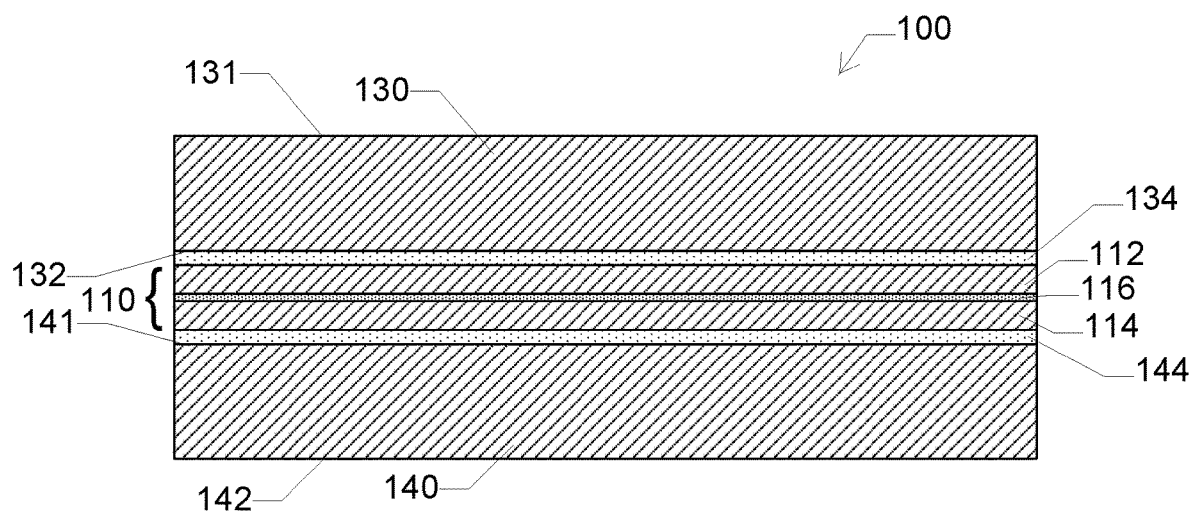
FIG. 1 is a schematic cross-sectional view of some embodiments of a window pane.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

As used herein the term "bow" refers to the amount of curvature exhibited by a sheet (e.g., a window pane or one or more layers thereof). The bow is determined by placing the sheet upright or vertically in a landscape orientation (e.g., with the length of the sheet extending horizontally and the width of the sheet extending vertically) and placing a flat bar diagonally across the concave side of the sheet so that the bar extends from a lower corning to an opposing upper corner. In the embodiments described herein, the bar was a 30 mm square aluminum bar. The bow is the distance between the sheet and the bar at the center of the sheet. In the embodiments described herein, the distance was measured using calipers.

As used herein, the term "average coefficient of thermal expansion," or "average CTE," refers to the average coefficient of linear thermal expansion of a given glass, ceramic, or glass-ceramic material or layer between 0° C. and 300° C. As used herein, the term "coefficient of thermal expansion," or "CTE," refers to the average coefficient of thermal expansion unless otherwise indicated. The CTE can be determined, for example, using the procedure described in ASTM E228 "Standard Test Method for Linear Thermal Expansion of Solid Materials With a Push-Rod Dilatometer" or ISO 7991:1987 "Glass—Determination of coefficient of mean linear thermal expansion."

In various embodiments described herein, a glass article (e.g., sheet or panel) comprises a compressive stress or a tensile stress at a given depth within the glass article (e.g., a distance from an outer surface of the glass article). Compressive stress and/or tensile stress values can be determined using any suitable technique including, for example, a birefringence based measurement technique, a refracted near-field (RNF) technique, or a photoelastic measurement technique (e.g., using a polarimeter). Exemplary standards for stress measurement include, for example, ASTM C1422/ C1422M-10 "Standard Specification for Chemically Strengthened Flat Glass" and ASTM F218 "Standard Method for Analyzing Stress in Glass." The "stress profile" of a glass article is the relationship of stress to depth within the glass article (e.g., as represented by a plot of stress versus depth).

In various embodiments, a window pane comprises a transmission control layer disposed between a first panel and a second panel. The transmission control layer comprises a transmission control material. For example, the transmission control material comprises a photochromic material, an electrochromic material, a liquid crystal material, or a combination thereof. In some embodiments, the transmission control layer consists essentially of or consists of a single layer of photochromic material (e.g., a photochromic glass sheet or photochromic polymer sheet). In other embodiments, the transmission control layer comprises a sheet (e.g., a glass sheet or a polymer sheet), and the transmission control material is disposed on the sheet. For example, the transmission control layer comprises an electrochromic material (e.g., an electrochromic polymer coating) disposed on the sheet. Additionally, or alternatively, the transmission control layer comprises a first sheet, a glass sheet, and a liquid crystal material disposed between the first sheet and the second sheet. For example, the first sheet is a first glass sheet. Additionally, or alternatively, the second sheet is a second glass sheet. In some embodiments, the first sheet and the second sheet are arranged substantially parallel to and spaced from each other to define a cell therebetween, and the liquid crystal material is disposed within the cell. In some embodiments, the sheet of the transmission control layer has a thickness of about 1 mm or less. For example, each of the first sheet and the second sheet has a thickness of about 1 mm or less. The first panel is bonded to a first surface of the transmission control layer, and the second panel is bonded to a second surface of the transmission control layer. For example, the first panel is bonded to the first sheet of the transmission control layer, and the second panel is bonded to the second sheet of the transmission control layer. The transmission control material is controllable to adjust a transmittance of the window pane. For example, the liquid crystal material of the transmission control layer is controllable to adjust a transmittance of the window pane.

In various embodiments, an insulated glazing unit (IGU) comprises a window pane as described herein, a third panel, and a spacer disposed between the window pane and the third panel such that a cavity is disposed between the window pane and the third panel and is substantially circumscribed by the spacer.

The thin first and second glass sheets of the transmission control layer as described herein can enable the window pane to have a reduced thickness without compromising the strength of the window pane. Additionally, or alternatively, positioning the transmission control layer between the first panel and the second panel as described herein can enable the window pane to have reduced bow compared to a window pane in which one of the first panel or the second panel is omitted. For example, in some embodiments, the first panel and the second panel are formed from similar materials (e.g., glass materials with equal or substantially equal CTE) and/or have equal or substantially equal thicknesses. Thus, the window pane has a symmetrical or substantially symmetrical configuration, which can enable the reduced bow. The window pane with reduced bow can enable the IGU with the window pane as described herein to exhibit reduced stress.

FIG. 1 is a schematic cross-sectional view of some embodiments of a window pane 100. In some embodiments, window pane 100 comprises a transmission control layer 110 disposed between a first panel 130 and a second panel 140. In some embodiments, window pane 100 (and/or various components or layers thereof) is configured as a sheet. For example, window pane 100 has a thickness, a width, and a length, with the width being greater than the thickness, and the length being greater than or equal to the width. In such embodiments, each of the width and the length can be substantially greater than the thickness. For example, each of the width and the length is at least 10 times, at least 100 times, or at least 1000 times greater than the thickness. The sheet can be planar or substantially planar (e.g., flat). Alternatively, the sheet can be non-planar (e.g., curved).

Figure 2:
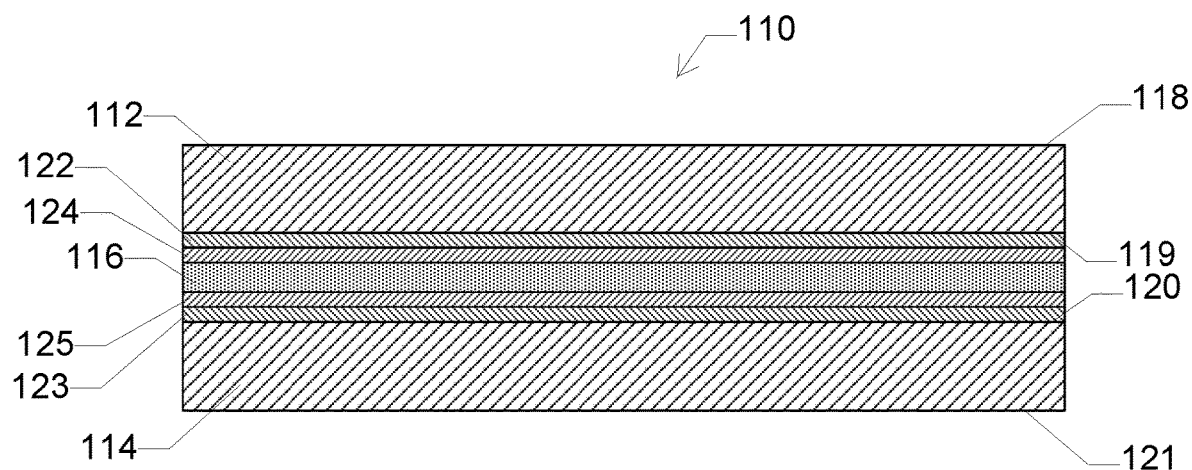
FIG. 2 is a schematic cross-sectional view of some embodiments of a transmission control layer of the window pane of FIG. 1.

FIG. 2 is a schematic cross-sectional view of some embodiments of transmission control layer 110. Transmission control layer 110 comprises a first sheet 112, a second sheet 114, and a liquid crystal material 116 disposed between the first sheet and the second sheet. First sheet 112 comprises a first surface 118 and a second surface 119 opposite the first surface. A thickness of first sheet 112 is the distance between first surface 118 and second surface 119. Second sheet 114 comprises a first surface 120 and a second surface 121 opposite the first surface. A thickness of second sheet 114 is a distance between first surface 120 and second surface 121.

In some embodiments, first sheet 112 is a relatively thin glass sheet. Additionally, or alternatively, second sheet 114 is a relatively thin glass sheet. For example, first sheet 112 and/or second sheet 114 have a thickness of about 1 mm or less, about 0.9 mm or less, about 0.8 mm or less, or about 0.7 mm or less. Additionally, or alternatively, first sheet 112 and/or second sheet 114 have a thickness of about 0.01 mm or more, about 0.02 mm or more, about 0.03 mm or more, about 0.04 mm or more, about 0.05 mm or more, about 0.1 mm or more, about 0.2 mm or more, about 0.3 mm or more, about 0.4 mm or more, or about 0.5 mm or more. For example, first sheet 112 and/or second sheet 114 have a thickness of about 0.5 mm to about 0.7 mm. The thicknesses of first sheet 112 and second sheet 114 can be the same or different.

In some embodiments, first sheet 112 and/or second sheet 114 comprise or are formed from a glass material, a ceramic material, a glass-ceramic material, a polymeric material, or a combination thereof. For example, in the embodiments shown in FIG. 2, each of first sheet 112 and second sheet 114 comprises or is formed from a glass material, a ceramic material, or a glass-ceramic material. In some embodiments, first sheet 112 and/or second sheet 114 comprise an aluminosilicate glass. Additionally, or alternatively, first sheet 112 and/or second sheet 114 comprise an alkali-free glass that is free or substantially free of alkali metals and components comprising alkali metals. For example, the alkali-free glass comprises 0.1 mol % or less, 0.05 mol % or less, or 0.01 mol % or less $R_2O$, expressed on an oxide basis, where R is one or more of Li, Na, or, K. The alkali-free glass can help to avoid alkali migration from first sheet 112 and/or second sheet 114 into liquid crystal material 116, thereby avoiding alkali materials screening the liquid crystal material from an applied voltage and maintaining the performance of the liquid crystal material. In some embodiments, first sheet 112 and/or second sheet 114 comprise an alkali-containing glass that comprises alkali metals or compounds comprising alkali metals. For example, the alkali-containing glass comprises 1 mol % or more, 5 mol % or more, or 10 mol % or more $R_2O$, expressed on an oxide basis, where R is one or more of Li, Na, or, K. Additionally, or alternatively, the alkali-containing glass is an alkali aluminosilicate glass. The compositions of first sheet 112 and second glass 114 can be the same or different.

In some embodiments, first sheet 112 and second sheet 114 are spaced from each other to define a cell therebetween, and liquid crystal material 116 is disposed within the cell. Additionally, or alternatively, first sheet 112 and second sheet 114 are arranged substantially parallel to each other. A thickness of the cell is a distance between second surface 119 of first sheet 112 and first surface 120 of second sheet 114. In some embodiments, the cell has a thickness of about 20 μm or less, about 18 μm or less, about 16 μm or less, about 14 μm or less, about 12 μm or less, or about 10 μm or less. Additionally, or alternatively, the cell has a thickness of about 6 μm or more. For example, the cell has a thickness of about 6 μm to about 10 μm, or about 8 μm. The thickness of the cell can be uniform (e.g., in embodiments in which first sheet 112 and second sheet 114 are arranged substantially parallel to each other) or non-uniform (e.g., in embodiments in which the first sheet and the second sheet are not arranged substantially parallel to each other). The performance of liquid crystal material 116 can be sensitive to the spacing between first sheet 112 and second sheet 114. In some embodiments, first sheet 112 and second sheet 114 have precise thickness uniformity and/or surface smoothness to enable precise and uniform spacing to enable desirable performance of liquid crystal material 116. For example, first sheet 112 and/or second sheet 114 are fusion formed glass sheets. For example, first sheet 112 and/or second sheet 114 are fusion formed glass sheets commercially available as EAGLE XG® glass substrates from Corning Incorporated (Corning, New York) or flexible glass sheets commercially available as Willow® Glass from Corning Incorporated (Corning, New York). Such fusion formed glass sheets can exhibit the desired thickness uniformity and surface characteristics to enable desirable liquid crystal material performance. Fusion formed glass sheets can be identified by the presence of a fusion line therein resulting from fusion of separate layers of glass into a single glass sheet during forming.

In some embodiments, liquid crystal material 116 defines a liquid crystal layer disposed between first sheet 112 and second sheet 114. In some embodiments, liquid crystal layer has a thickness of about 20 μm or less, about 18 μm or less, about 16 μm or less, about 14 μm or less, about 12 μm or less, or about 10 μm or less. Additionally, or alternatively, the liquid crystal layer has a thickness of about 6 μm or more. For example, the liquid crystal layer has a thickness of about 6 μm to about 10 μm, or about 8 μm. The thickness of the liquid crystal layer can be uniform or non-uniform (e.g., tapered).

In some embodiments, liquid crystal material 116 comprises a polymer dispersed liquid crystal (PDLC) material, a guest host liquid crystal material, a cholesteric liquid crystal material, a chiral liquid crystal material, a nematic liquid crystal material, or a combination thereof. Liquid crystal material 116 can be manipulated (e.g., by subjecting the liquid crystal material to an electric field) to adjust a transmittance of the liquid crystal material, thereby adjusting a transmittance of window pane 100.

In some embodiments, transmission control layer 110 comprises a first conductive layer 122 disposed between first sheet 112 and liquid crystal material 116. Additionally, or alternatively, transmission control layer 110 comprises a second conductive layer 123 disposed between second sheet 114 and liquid crystal material 116. Thus, first conductive layer 122 and/or second conductive layer 123 can be disposed within the cell defined between first sheet 112 and second sheet 114. In some embodiments, first conductive layer 122 and/or second conductive layer 123 comprises or is formed from a transparent conductor material. For example, first conductive layer 122 and/or second conductive layer 123 comprises a transparent conductive oxide (TCO), a conductive polymer, a metal grid, carbon nanotubes (CNT), graphene, a nanowire mesh, an ultra-thin metal, or a combination thereof. In some embodiments, first conductive layer 122 and/or second conductive layer 123 comprises indium tin oxide (ITO), fluorine-doped tin oxide (FTO), or a combination thereof. First conductive layer 122 and second conductive layer 123 can serve as electrodes for subjecting liquid crystal material 116 to an electric field to adjust the transmittance of the liquid crystal material. In some embodiments, one or both of first conductive layer 122 or second conductive layer 123 is patterned to divide transmission control layer 110 into a plurality of zones that can be dimmed independently of each other.

In some embodiments, transmission control layer 110 comprises a first alignment layer 124 disposed between first sheet 112 and liquid crystal material 116. For example, in the embodiments shown in FIG. 2, first alignment layer 124 is disposed between first conductive layer 122 and liquid crystal material 116. Additionally, or alternatively, transmission control layer 110 comprises a second alignment layer 125 disposed between second sheet 114 and liquid crystal material 116. For example, in the embodiments shown in FIG. 2, second alignment layer 125 is disposed between second conductive layer 123 and liquid crystal material 116. Thus, first alignment layer 124 and/or second alignment layer 125 can be disposed within the cell defined between first sheet 112 and second sheet 114. First alignment layer 124 and second alignment layer 125 can help to orient molecules of liquid crystal material 116 at a particular angle (e.g., a pretilt angle) relative to the respective alignment layer. For example, first alignment layer 124 and/or second alignment layer 125 are formed from or comprise an organic or inorganic material with a determined surface structure formed thereon that helps to align liquid crystal material 116.

In some embodiments, transmission control layer 110 comprises a sealant disposed between first sheet 112 and second sheet 114. The sealant can substantially circumscribe liquid crystal material 116, which can help to retain the liquid crystal in place between first sheet 112 and second sheet 114 and/or protect the liquid crystal material from environmental exposure that could damage the liquid crystal material. For example, the sealant comprises a ring of polymeric material or glass frit disposed about a perimeter of the cell.

A thickness of transmission control layer 110 is a distance between outer surfaces of the transmission control layer. For example, in the embodiments shown in FIGS. 1-2, the thickness of transmission control layer 110 is a distance between first surface 118 of first sheet 112 and second surface 121 of second sheet 114. In some embodiments, transmission control layer 110 has a thickness of about 1.5 mm or less, about 1.4 mm or less, about 1.3 mm or less, about 1.2 mm or less, about 1.1 mm or less, or about 1 mm or less. Additionally, or alternatively, transmission control layer 110 has a thickness of about 0.1 mm or more, about 0.2 mm or more, about 0.3 mm or more, about 0.4 mm or more, about 0.5 mm or more, about 0.6 mm or more, about 0.7 mm or more, about 0.8 mm or more, about 0.9 mm or more, or about 1 mm or more. The relatively thin first sheet 112 and second sheet 114 can enable transmission control layer 110 to have a reduced thickness compared to conventional liquid crystal panels. Such a reduced thickness of transmission control layer 110 can enable a reduced thickness of window pane 100 and/or an IGU comprising the window pane.

Although transmission control layer 110 is described herein as comprising liquid crystal material 116 disposed between first sheet 112 and second sheet 114, other embodiments are included in this disclosure. In other embodiments, the transmission control layer comprises a transmission control material, which may or may not include a liquid crystal material. For example, the transmission control material comprises a photochromic material, an electrochromic material, a liquid crystal material, or a combination thereof. In some embodiments, the transmission control layer consists essentially of or consists of a single layer of photochromic material (e.g., a photochromic glass sheet or photochromic polymer sheet). In other embodiments, the transmission control layer comprises a sheet, and the transmission control material is disposed on the sheet. For example, the transmission control layer comprises an electrochromic material (e.g., an electrochromic polymer coating) disposed on the sheet. In various embodiments, the transmission control layer is disposed between first panel 130 and second panel 140 as described herein, which can enable reduced bow of the window pane also as described herein.

In some embodiments, transmission control layer 110 is disposed between first panel 130 and second panel 140 as shown in FIG. 1. For example, first panel 130 is bonded to first sheet 112 (e.g., first surface 118 of the first sheet). Additionally, or alternatively, second panel 140 is bonded to second sheet 114 (e.g., second surface 121 of the second sheet). In some embodiments, first panel 130 is configured as a sheet. Thus, first panel 130 comprises a first surface 131 and a second surface 132 opposite the first surface. A thickness of first panel 130 is the distance between first surface 131 and second surface 132. Additionally, or alternatively, second panel 140 is configured as a sheet. Thus, second panel 140 comprises a first surface 141 and a second surface 142 opposite the first surface. A thickness of second panel 140 is a distance between first surface 141 and second surface 142.

In some embodiments, first panel 130 is a relatively thick panel. Additionally, or alternatively, second panel 140 is a relatively thick panel. For example, first panel 130 and/or second panel 140 have a thickness of about 1 mm or more, about 1.5 mm or more, about 2 mm or more, about 2.5 mm or more, about 3 mm or more, about 3.5 mm or more, or about 4 mm or more. Additionally, or alternatively, first panel 130 and/or second panel 140 have a thickness of about 10 mm or less, about 9.5 mm or less, about 9 mm or less, about 8.5 mm or less, about 8 mm or less, about 7.5 mm or less, about 7 mm or less, about 6.5 mm or less, or about 6 mm or less. For example, first panel 130 and/or second panel 140 have a thickness of about 4 mm to about 6 mm. The thicknesses of first panel 130 and second panel 140 can be the same or different.

In some embodiments, first panel 130 comprises or is formed from a glass material, a ceramic material, a glass-ceramic material, a polymeric material, or a combination thereof. Additionally, or alternatively, second panel 140 comprises or is formed from a glass material, a ceramic material, a glass-ceramic material, a polymeric material, or a combination thereof. In some embodiments, first panel 130 and/or second panel 140 comprise an aluminosilicate glass. In some of such embodiments, first panel 130 and/or second panel 140 comprise an alkali aluminosilicate glass. For example, first panel 130 and/or second panel 140 comprise a glass commercially available as Gorilla® Glass from Corning Incorporated (Corning, New York) or soda lime glass. The compositions of first panel 130 and second panel 140 can be the same or different.

In some embodiments, first panel 130 is a strengthened glass panel. Additionally, or alternatively, second panel 140 is a strengthened glass panel. For example, first panel 130 and/or second panel 140 are thermally tempered glass panels. Additionally, or alternatively, first panel 130 and/or second panel 140 are chemically strengthened or ion-exchanged glass panels. Such strengthened glass panels can have a compressive stress at one or both outer surfaces of the panel and a tensile stress at an intermediate region of the panel. The compressive stress can help to prevent cracks from propagating within the panel. Strengthened first panel 130 and/or second panel 140 can enable the thicknesses of the panels to be reduced, thereby enabling window pane 100 and/or an IGU comprising the strengthened panels to have a reduced thickness compared to conventional window panes and/or IGUs, which can enable a reduced weight.

In some embodiments, first panel 130 is bonded to first sheet 112 with a first adhesive layer 134. Additionally, or alternatively, second panel 140 is bonded to second sheet 114 with a second adhesive layer 144. In some embodiments, first adhesive layer 134 and/or second adhesive layer 144 comprise a polymeric adhesive. For example, first adhesive layer 134 and/or second adhesive layer 144 comprise polyvinyl butyral (PVB), ethylene vinyl acetate (EVA), thermoplastic polyurethane (TPU), an ionomer, an ionoplast, or a combination thereof. Additionally, or alternatively, first adhesive layer 134 and/or second adhesive layer 144 block ultraviolet (UV) light. In some embodiments, first adhesive layer 134 and/or second adhesive layer 144 have an average transmittance of 20% or less, 15% or less, 10% or less, 9% or less, 8% or less, 7% or less, 6% or less, 5% or less, 4% or less, 3% or less, 2% or less, or 1% or less in a wavelength range of 10 nm to 380 nm. For example, first adhesive layer 134 and/or second adhesive layer 144 comprises an interlayer material commercially available as Saflex® from Eastman Chemical Company (Kingsport, Tennessee). In some embodiments, liquid crystal material 116 is disposed between UV blocking first adhesive layer 134 and UV blocking second adhesive layer 144. In such embodiments, window pane 100 is installed in a building as described herein such that UV blocking first adhesive layer 134 helps to prevent UV light present in sunlight incident on the window pane from damaging liquid crystal material 116 and UV blocking second adhesive layer 144 helps to prevent UV light present in artificial building light (e.g., fluorescent light) incident on the window pane from damaging the liquid crystal material. Thus, positioning the liquid crystal material between UV blocking adhesive layers can help to protect the liquid crystal material from UV light incident on opposing surfaces of the window pane.

First panel 130 can be bonded to first glass sheet 112 using a suitable lamination process. For example, first adhesive layer 134 is applied to first panel 130 and/or first sheet 112 by roll coating, curtain coating, or another suitable coating or printing process, and the first panel, the first adhesive layer, and the first sheet are positioned in a stack. Additionally, or alternatively, second adhesive layer 144 is applied to second panel 140 and/or second sheet 114, and the second panel, the second adhesive layer, and the second sheet are positioned in a stack. In some embodiments, transmission control layer 110 is formed prior to bonding first panel 130 and/or second panel 140 thereto. Thus, the stack comprises first panel 130, first adhesive layer 134, first sheet 112, liquid crystal material 116, second sheet 114, second adhesive layer 144, and second panel 140. In some embodiments, the stack is preliminarily laminated using a flatbed laminator (e.g., in a de-air and tack process) or another suitable laminator. Additionally, or alternatively, the stack is bonded in an autoclave or another suitable heating and/or pressing apparatus.

A thickness of first adhesive layer 134 and second adhesive layer 144 is a distance between outer surfaces of the respective adhesive layer. For example, in the embodiments shown in FIG. 1, the thickness of first adhesive layer 134 is a distance between second surface 132 of first panel 130 and first surface 118 of first sheet 112. Additionally, or alternatively, the thickness of second adhesive layer 144 is a distance between first surface 141 of second panel 140 and second surface 121 of second sheet 114. In some embodiments, first adhesive layer 134 and/or second adhesive layer 144 have a thickness of about 1 mm or less, about 0.9 mm or less, about 0.8 mm or less, about 0.7 mm or less, about 0.6 mm or less, or about 0.5 mm or less. Additionally, or alternatively, first adhesive layer 134 and/or second adhesive layer 144 have a thickness of about 0.1 mm or more, about 0.2 mm or more, about 0.3 mm or more, about 0.4 mm or more, about 0.5 mm or more, about 0.6 mm or more, or about 0.7 mm or more. For example, first adhesive layer 134 and/or second adhesive layer 144 have a thickness of about 0.6 mm to about 0.7 mm. The thicknesses of first adhesive layer 134 and second adhesive layer 144 can be the same or different.

A thickness of window pane 100 is a distance between outer surfaces of the window pane. For example, in the embodiments shown in FIG. 1, the thickness of window pane 100 is a distance between first surface 131 of first panel 130 and second surface 142 of second panel 140. In some embodiments, window pane 100 has a thickness of about 15 mm or less, about 14 mm or less, about 13 mm or less, about 12 mm or less, about 11 mm or less, or about 10 mm or less. Additionally, or alternatively, window pane 100 has a thickness of about 8 mm or more, about 9 mm or more, or about 10 mm or more.

The position of transmission control layer 110 between first panel 130 and second panel 140 can enable window pane 100 to have a reduced bow compared to a window pane in which one of the first panel or the second panel is omitted. For example, in some embodiments, window pane 100 comprises a bow of about 0.4 mm or less, 0.3 mm or less, 0.2 mm or less, 0.1 mm or less, 0.05 mm or less, 0.04 mm or less, 0.03 mm or less, or 0.02 mm or less. In some embodiments, the bow can be normalized per unit of length. For example, in some embodiments, window pane 100 comprises a bow of about 0.2 mm or less per 40 mm of length, about 0.18 mm or less per 40 mm of length, about 0.16 mm or less per 40 mm of length, about 0.14 mm or less per 40 mm of length, about 0.12 mm or less per 40 mm of length, about 0.1 mm or less per 40 mm of length, about 0.08 mm or less per 40 mm of length, about 0.06 mm or less per 40 mm of length, about 0.04 mm or less per 40 mm of length, about 0.02 mm or less per 40 mm of length, about 0.01 mm or less per 40 mm of length, about 0.005 mm or less per 40 mm of length, about 0.004 mm or less per 40 mm of length, about 0.003 mm or less per 40 mm of length, about 0.002 mm or less per 40 mm of length, or about 0.001 mm or less per 40 mm of length.

As the width and/or the length of a window pane increase, the bow also tends to increase. In some embodiments, the width of window pane 100 is about 350 mm or more, about 400 mm or more, about 450 mm or more, about 500 mm or more, about 600 mm or more, about 700 mm or more, about 800 mm or more, about 900 mm or more, about 1000 mm or more, about 1500 mm or more, about 2000 mm or more, or about 2500 mm or more. Additionally, or alternatively, the width of window pane 100 is about 5000 mm or less, about 4000 mm or less, or about 3000 mm or less. Additionally, or alternatively, a length of window pane 100 is about 350 mm or more, about 400 mm or more, about 450 mm or more, about 500 mm or more, about 600 mm or more, about 700 mm or more, about 800 mm or more, about 900 mm or more, about 1000 mm or more, about 1500 mm or more, about 2000 mm or more, or about 2500 mm or more. Additionally, or alternatively, the length of window pane 100 is about 5000 mm or less, about 4000 mm or less, or about 3000 mm or less. The width of window pane 100 and the length of window pane 100 can be the same or different. In some embodiments, window pane 100 comprises the low bow described herein in spite of the large width and/or length. Such low bow can be enabled by the position of transmission control layer 110 between first panel 130 and second panel 140 as described herein.

In some embodiments, window pane 100 comprises a symmetric configuration. For example, first panel 130 and second panel 140 have the same or substantially the same thickness, composition, CTE, and/or stress profile. Such a symmetric configuration can enable the reduced bow of window pane 100. For example, a window pane in which one of the first panel or the second panel is omitted can warp with changes in temperature due to differential expansion or contraction of the remaining panel and the transmission control layer. In contrast, the symmetric configuration of window pane 100 described herein can help to prevent such warping by reducing or eliminating differential expansion or contraction of first panel 130 relative to second panel 140.

Figure 3:
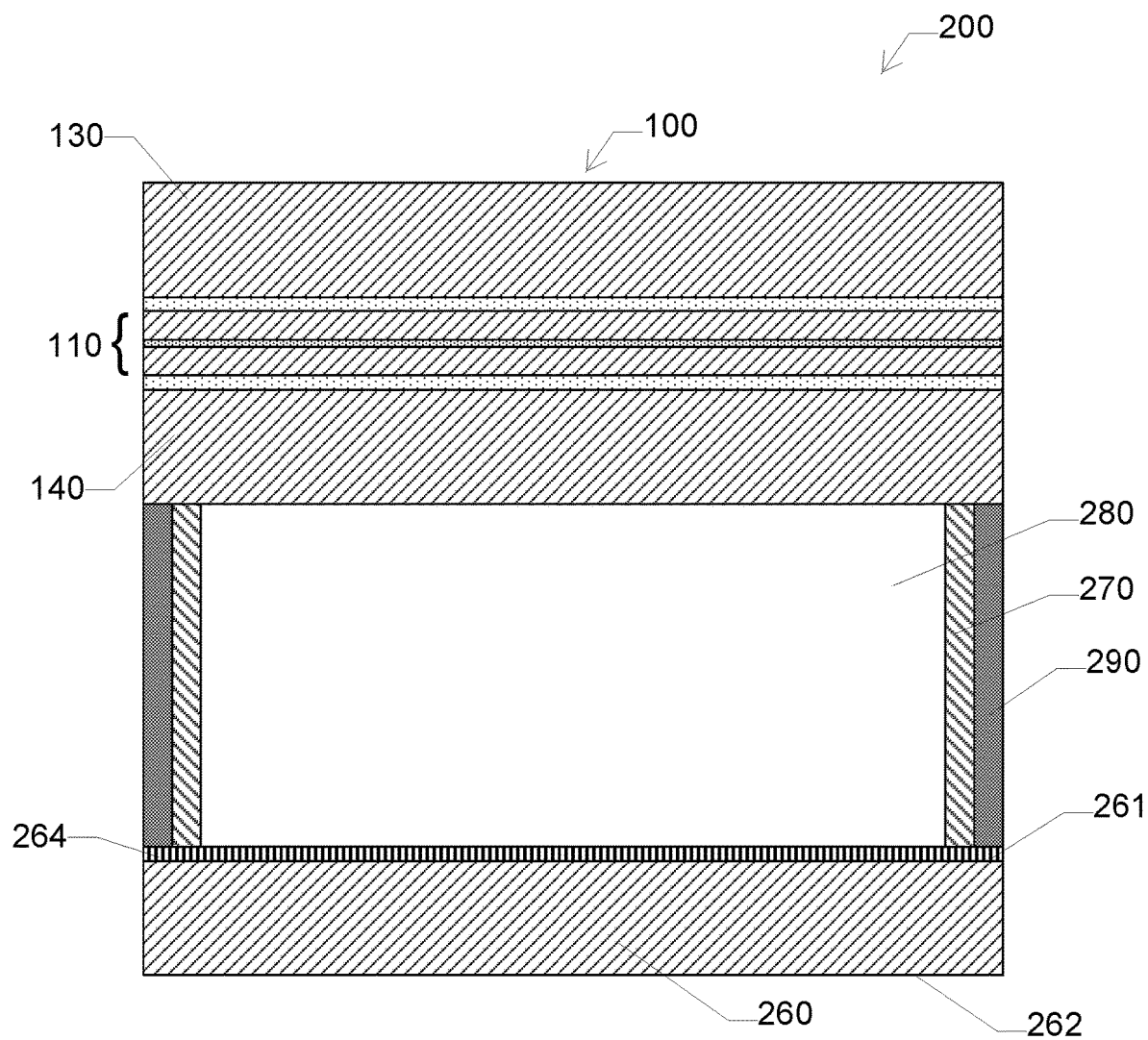
FIG. 3 is a cross-sectional schematic view of some embodiments of an IGU comprising the window pane of FIG. 1.

FIG. 3 is a cross-sectional schematic view of some embodiments of an IGU 200 comprising window pane 100. IGU 200 comprises a third panel 260 and a spacer 270 disposed between window pane 100 and the third panel such that a cavity 280 is disposed between the window pane and the third panel. In some embodiments, third panel 260 can be configured as described herein in reference to first panel 130 and/or second panel 140. For example, third panel 260 is a sheet comprising a first surface 261, a second surface 262 opposite the first surface, and a thickness extending between the first surface and the second surface. Additionally, or alternatively, third panel 260 can be a relatively thick panel as described herein. Additionally, or alternatively, third panel 260 can be a strengthened or glass sheet or a non-strengthened glass sheet. In some embodiments, IGU 200 comprises a single transmission control layer (e.g., transmission control layer 110) and/or a single liquid crystal layer (e.g., defined by liquid crystal material 116). Thus, window pane 100 can be free of additional transmission control layers and/or liquid crystal layers. Such a single transmission control layer and/or liquid crystal layer can be enabled by improved performance of transmission control layer 110 and/or liquid crystal material 116 (e.g., capable of achieving greater tinting or reduced transmission despite reduced thickness), which can be enabled by the uniform thickness and/or surface properties of first glass sheet 112 and/or second glass sheet 114 as described herein.

In some embodiments, spacer 270 substantially circumscribes cavity 280. For example, spacer 270 comprises a frame disposed near the edges of window pane 100 and third panel 260 and extending substantially entirely or entirely around a perimeter of cavity 280. Spacer 270 can help to maintain separation between window pane 100 and third panel 260. Thus, a thickness of spacer 270 can be substantially equal to a thickness of cavity 280. In some embodiments, spacer 270 comprises a metallic material, a polymeric material, a glass material, a ceramic material, a glass-ceramic material, or a combination thereof. For example, spacer 270 comprises aluminum or an aluminum alloy. In some embodiments, spacer 270 comprises a desiccant material. For example, spacer 270 comprises a groove formed therein (e.g., on an inward surface facing cavity 280), and the desiccant material is disposed within the groove. The desiccant material can help to remove moisture from cavity 280 to prevent condensation from forming on inward facing surfaces of window pane 100 and/or third panel 260 (e.g., second surface 142 of second pane 140 and/or first surface 261 of third pane 260).

In some embodiments, spacer 270 and/or a frame disposed about a periphery of IGU 200 can maintain window pane 100 in a planar or substantially planar state. Thus, the reduced bow of window pane 100 as described herein can reduce the force exerted on spacer 270 and/or the frame of IGU 200, which can improve the mechanical integrity of the IGU.

In some embodiments, cavity 280 comprises a gas disposed therein. For example, cavity 280 comprises air, nitrogen, neon, argon, krypton, or a combination thereof disposed therein. In other embodiments, cavity 280 comprises at least a partial vacuum drawn therein. The gas or vacuum in cavity 280 can reduce the conduction of heat through the cavity, thereby reducing the conduction of heat through IGU 200. Such reduced conduction of heat can increase the insulating efficiency of the IGU, which can be beneficial in architectural applications (e.g., exterior building windows).

In some embodiments, the thickness of cavity 280 is a distance between second surface 142 of second pane 140 and first surface 261 of third pane 260 (or an inward facing surface of a low-e coating disposed on the third pane as described herein). In some embodiments, cavity 280 has a thickness of about 15 mm or less, about 14 mm or less, about 13 mm or less, about 12 mm or less, about 11 mm or less, or about 10 mm or less. Additionally, or alternatively, cavity 280 has a thickness of about 9 mm or more, about 10 mm or more, about 11 mm or more, about 12 mm or more, about 13 mm or more, or about 14 mm or more. For example, cavity 280 has a thickness of about 10 mm to about 14 mm or about 12 mm. The thickness of cavity 280 can enable reduced heat conduction through the cavity.

In some embodiments, IGU 200 comprises a seal 290. For example, seal 290 is disposed between window pane 100 and third panel 260. Additionally, or alternatively, seal 290 circumscribes or substantially circumscribes cavity 280 and/or spacer 270. Seal 290 can help to prevent gas within cavity 280 from escaping the cavity and/or prevent atmospheric gas and/or liquid from entering the cavity, thereby helping to maintain the insulating properties of IGU 200. In some embodiments, seal 290 comprises a silicone material.

In some embodiments, IGU 200 comprises a low-e coating layer 264. In some of such embodiments, low-e coating layer 264 is disposed on a surface of third panel 260. For example, low-e coating layer 264 is disposed on first surface 261 of third panel 260. In other embodiments, the low-e coating layer is disposed on the window pane (e.g., second surface 142 of second pane 140). Positioning the low-e coating layer on an inward facing surface of the window pane or the third layer (e.g., within the cavity of the IGU) can help to protect the low-e coating layer from environmental exposure and/or maintain scratch and/or chemically resistant outer surfaces of the IGU.

A thickness of IGU 200 is the distance between outer surfaces of the IGU. For example, in the embodiments shown in FIG. 3, the thickness of IGU 200 is the distance between first surface 131 of first glass sheet 130 and the second surface 262 of third panel 260. The relatively thin window pane 100 can enable IGU 200 to have a reduced thickness compared to an IGU with a thicker window pane. In some embodiments, the thickness of cavity 280 is about 12 mm or more, and the thickness of IGU 200 is about 37 mm or less, about 36 mm or less, about 35 mm or less, about 34 mm or less, about 33 mm or less, about 32 mm or less, about 31 mm or less, or about 30 mm or less.

EXAMPLES

Various embodiments will be further clarified by the following examples.

Example 1

A window pane having the general configuration shown in FIG. 1 was formed. The transmission control layer had the general configuration shown in FIG. 2. Each of the first sheet and the second sheet of the transmission control layer was an alkali-free aluminosilicate glass sheet with a thickness of 0.7 mm, a width of 500 mm, and a length of 750 mm. The liquid crystal layer had a thickness of 8.5 µm. Each of the first panel and the second panel was an annealed (e.g., non-strengthened) soda lime glass sheet with a thickness of 4 mm, a width of 506 mm, and a length of 754 mm. The first panel and the second panel were bonded to the transmission control layer with a PVB adhesive with a thickness of 0.76 mm.

The average bow of the window pane was 0.02 mm, or 0.001 mm per 40 mm of length.

Comparative Example 1

A window pane was formed as described in Example 1, except that the second pane was omitted such that the window pane had an asymmetric configuration.

The average bow of the window pane was 0.56 mm, or 0.03 mm per 40 mm of length.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A window pane comprising:
    a transmission control layer comprising a first glass sheet, a second glass sheet, and a liquid crystal material disposed between the first glass sheet and the second glass sheet, each of the first glass sheet and the second glass sheet is a fusion formed alkali-free aluminosilicate glass sheet having a thickness of 0.5 mm to 0.7 mm, a width of 400 mm to 600 mm, and a length of 600 mm to 900 mm, wherein the fusion formed alkali-free aluminosilicate glass sheet comprises 0.1 mol % or less R$_2$O, expressed on an oxide basis, where R is one or more of Li, Na, and K;

a first glass panel comprising a soda lime glass having a thickness of 3 mm to 5 mm bonded to the first glass sheet of the transmission control layer with a polyvinyl butyral adhesive; and a second glass panel comprising a soda lime glass having a thickness of 3 mm to 5 mm bonded to the second glass sheet of the transmission control layer with a polyvinyl butyral adhesive;

wherein the transmission control layer is disposed between the first glass panel and the second glass panel;

wherein the liquid crystal material is controllable to adjust a transmittance of the window pane;

wherein the first glass sheet and the second glass sheet of the transmission control layer are arranged substantially parallel to and spaced from each other to define a cell therebetween, and the liquid crystal material is disposed within the cell;

wherein the cell has a thickness of 10 μm or less; and wherein a bow of the window pane is 0.02 mm or less per 40 mm of length.

2. The window pane of claim 1, wherein:
a width of the window pane is 500 mm to 600 mm; and
a length of the window pane is 750 mm to 900 mm.

3. The window pane of claim 1, wherein the transmission control layer comprises:
a first conductive layer disposed between the first glass sheet and the liquid crystal material; and
a second conductive layer disposed between the second glass sheet and the liquid crystal material.

4. The window pane of claim 1, wherein the transmission control layer comprises:
a first alignment layer disposed between the first glass sheet and the liquid crystal material; and
a second alignment layer disposed between the second glass sheet and the liquid crystal material.

5. The window pane of claim 1, wherein the liquid crystal material comprises a polymer dispersed liquid crystal (PDLC) material, a guest host liquid crystal material, a cholesteric liquid crystal material, a chiral liquid crystal material, a nematic liquid crystal material, or a combination thereof.

6. The window pane of claim 1, wherein a thickness of the transmission control layer is 1.5 mm or less.

7. The window pane of claim 1, wherein a thickness of the window pane is 15 mm or less.

8. A window pane comprising:
a transmission control layer comprising a first glass sheet, a second glass sheet, and a liquid crystal material disposed between the first glass sheet and the second glass sheet, each of the first glass sheet and the second glass sheet is an alkali-free aluminosilicate glass sheet that comprises 0.1 mol % or less R$_2$O, expressed on an oxide basis, where R is one or more of Li, Na, and K, and has a thickness of 0.5 mm to 0.7 mm, a width of 400 mm to 600 mm, and a length of 600 mm to 900 mm;

a first glass panel comprising a soda lime glass having a thickness of 3 mm to 5 mm bonded to the first glass sheet of the transmission control layer with a polyvinyl butyral adhesive; and a second glass panel comprising a soda lime glass having a thickness of 3 mm to 5 mm bonded to the second glass sheet of the transmission control layer with a polyvinyl butyral adhesive;

wherein the transmission control layer is disposed between the first glass panel and the second glass panel;

wherein the liquid crystal material is controllable to adjust a transmittance of the window pane;

wherein the first glass sheet and the second glass sheet of the transmission control layer are arranged substantially parallel to and spaced from each other to define a cell therebetween, and the liquid crystal material is disposed within the cell;

wherein the cell has a thickness of 10 μm or less; and wherein a bow of the window pane is 0.002 mm or less per 40 mm of length.

* * * * *

UNITED STATES PATENT AND TRADEMARK OFFICE
CERTIFICATE OF CORRECTION

PATENT NO. : 11,872,787 B2
APPLICATION NO. : 16/348258
DATED : January 16, 2024
INVENTOR(S) : James Gregory Couillard et al.

Page 1 of 1

It is certified that error appears in the above-identified patent and that said Letters Patent is hereby corrected as shown below:

In the Specification

In Column 1, Line 10, after "which" delete "is".

Signed and Sealed this
Seventh Day of January, 2025

Derrick Brent
*Acting Director of the United States Patent and Trademark Office*